US008984124B2

(12) United States Patent
Maralack et al.

(10) Patent No.: US 8,984,124 B2
(45) Date of Patent: Mar. 17, 2015

(54) SYSTEM AND METHOD FOR ADAPTIVE DATA MONITORING

(75) Inventors: David Maralack, Snoqualmie, WA (US); Paul A. Cooke, Sammamish, WA (US); Stephen T. Olson, Duvall, WA (US); Joseph P. Mullally, Seattle, WA (US); Frank Riese, Kirkland, WA (US); Scott Sovine, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 13/308,241

(22) Filed: Nov. 30, 2011

(65) Prior Publication Data

US 2013/0138801 A1     May 30, 2013

(51) Int. Cl.
*G06F 15/173*     (2006.01)
*G06F 11/34*     (2006.01)

(52) U.S. Cl.
CPC ........ *G06F 11/3495* (2013.01); *G06F 2201/86* (2013.01)
USPC ......................................... 709/224; 709/223

(58) Field of Classification Search
CPC .......... G06Q 30/0282; G06Q 30/0631; G06Q 10/063116; G06Q 10/1095; G06Q 30/0627; G06Q 10/063114; G06Q 10/0637; G06Q 10/0639; G06Q 10/10; G06Q 20/02; G06Q 20/06; H04L 65/60; H04L 43/04; H04L 43/08; H04L 43/10; H04L 43/16; H04L 51/04; H04L 12/00; H04L 1/20; H04L 29/06; H04L 41/0213; H04L 41/0604
See application file for complete search history.

(56) References Cited

U.S. PATENT DOCUMENTS

| | | | |
|---|---|---|---|
| 6,681,249 B2 | 1/2004 | Christensen et al. | |
| 6,754,664 B1 * | 6/2004 | Bush | 1/1 |
| 6,769,024 B1 | 7/2004 | Natarajan et al. | |
| 7,881,438 B2 | 2/2011 | Cioffi et al. | |
| 2002/0099818 A1 * | 7/2002 | Russell et al. | 709/224 |
| 2004/0042469 A1 | 3/2004 | Clark et al. | |
| 2004/0133633 A1 | 7/2004 | Fearnley et al. | |
| 2005/0198274 A1 * | 9/2005 | Day | 709/224 |
| 2006/0230026 A1 * | 10/2006 | Pereira | 707/3 |
| 2007/0027987 A1 * | 2/2007 | Tripp et al. | 709/225 |
| 2008/0208979 A1 * | 8/2008 | Vishwanath et al. | 709/206 |
| 2010/0069057 A1 * | 3/2010 | Boiero et al. | 455/419 |
| 2010/0195521 A1 | 8/2010 | Wanstedt et al. | |
| 2012/0222120 A1 * | 8/2012 | Rim et al. | 726/24 |

OTHER PUBLICATIONS

Garlan, et al., "Software Architecture-based Self-adaptation", Published on: 2009, Available at: http://www.springer.com/cda/content/document/cda_downloaddocument/9780387898278-c2.pdf?SGWID=0-0-45-734916-p173871105.

* cited by examiner

*Primary Examiner* — Wing F Chan
*Assistant Examiner* — Padma Mundur
(74) *Attorney, Agent, or Firm* — John Jardine; Kate Drakos; Micky Minhas (57) ABSTRACT

A monitoring information reporting system for a client computer, the system provides monitoring information to a server computer which receives monitoring information for analysis. The system provides a framework for a client computer to identify to a server computer the monitoring information it can provide. The server computer then determines, based on the notification, whether monitoring information is to be provided, and if so, the specific monitoring information that will be provided. When monitoring information is to be provided, the server computer sends a response to the client computer with a command to control the client computer to collect monitoring information, which is then provided to the server computer. In this way, the server computer can control the amount and nature of monitoring information collected and transferred.

20 Claims, 6 Drawing Sheets

```
<?xml version="1.0" encoding="UTF-8"?>
<notification version="2">
  <monitoring>
    <machine>
      <os>
        <arg name="lcid" value="1042" />
        <arg name="vermaj" value="6" />
        <arg name="vermin" value="1" />
        <arg name="verbld" value="7600" />
        <arg name="csdbld" value="16385" />
      </os>
      <hardware>
        <arg name="sysmfg" value="ABC Electronics" />
        <arg name="syspro" value="_MF" />
        <arg name="bv" value="MFF05" />
      </hardware>
    </machine>
    <namespace service="monitoring" group="windows" application="winword"/>
      <command name="notification-request">
        <argument name="key" value="{cc1c6ee0-f832-421e-95ea-0aef4337f3d7}" />
      </command>
  </monitoring>
</notification>
```

FIG. 4

```
<response>
  <namespace service="monitoring" group="windows" application="winword"/>
  <command name="notification-response">
    <argument name="1:000a6b82e8ffg28810c9a19" value="7ba7b203819bd972bf74">
    <argument name="1:000a6b82e8ffg9c9a83a22d" value="9290ca62bd93ef72g821">
  </command>
</response>
```

FIG. 5

SYSTEM AND METHOD FOR ADAPTIVE DATA MONITORING

BACKGROUND

To improve the quality of software applications, monitoring information services have been provided by operating system vendors. These services collect monitoring information relating to the operating system or to applications and application programming interfaces (APIs) executing within the operating system. This information may be aggregated at a central point so that patterns may be identified and used to improve the operating system, applications and APIs.

Such monitoring information may be provided by programming an application to supply it. Such an approach may be used to supply monitoring information periodically. However, programming an application in this way requires application development that is specific to each application. This increases development time and furthermore may result in updates to an application's code each time the application becomes capable of supplying additional monitoring information.

In some computer environments, the monitoring information from a variety of applications, APIs and/or a number of operating systems executing on one or more client computers may be transmitted to a third party for analysis, for example, by transmitting the data over the Internet to a server computer administered by a third party, which could be the provider of the application, API or operating system. In such an environment, all client computers may supply monitoring information, and each client computer may supply all of the monitoring information it has available.

Upon receiving monitoring information, it may be useful to allow a third party to make business decisions based on the monitoring information. For example, in determining the impact a proposed change to an existing application might have on a population of client computers executing the application, the third party may analyze monitoring information in order to decide whether or not to implement the proposed change.

SUMMARY

The utility of a performance monitoring service, including a component within an operating system of a computer, may be extended by providing a generic structure for exchanging commands and data with a server collecting monitoring information from multiple client computers. A component of such a service, executing on the server, may determine the types of data that are available for request, and may consequently issue commands targeting certain data to be reported.

The generic framework allows a client computer to provide a notification of data it can provide. A server computer may use the notifications received from one or more clients to identify data to obtain. The server may use the generic structure to generate commands that instructs the identified client computers as to what data to provide, and in what manner.

In some embodiments of a performance monitoring service, a client computer sends a notification to a server computer specifying types of monitoring information that the client is configured to provide. If the server computer determines that monitoring information is to be provided by that client, it sends a response to the client computer. The client computer then collects monitoring information based on the content of the response and provides the monitoring information to the server computer. In this way, the monitoring information requested by the server computer is collected and transferred. Updates to the monitoring information requirements of the server computer can be implemented without changes to the client computers. In addition, so long as the client computer is configured to provide notifications to the server computer, updates to the client computer operating system to support updated performance monitoring requirements may not be required, or may be required infrequently.

In further embodiments of the invention, a notification comprises an identifier that identifies one or more types of monitoring information the client computer is configured to provide. Such an identifier may identify particular applications or application programming interfaces (API) executing on the client computer and may be used by a server computer to determine whether to request monitoring information.

In yet further embodiments of the invention, the notification comprises a unique identifier representing the client computer that sends the notification. The unique identifier may be obtained in any suitable way, including by applying a function, such as a hash function, to a combination of quantities unique to the client computer.

In yet further embodiments of the invention, monitoring information is provided to a different network location than was provided the notification. In a further aspect, a computer storage medium may be programmed with computer-executable instructions for performing, in a client/server computing environment, a method for reporting information to a server computer. In accordance with the method, a client computer may send a notification, including a name-value pair, to a server computer. The client may then receive a response to the notification and collect monitoring information based on the response. The client may sending the monitoring information to the server computer.

In another aspect, a system may include a client and a server. The client computer may be configured to send a notification comprising a name-value pair to the server computer, to collect monitoring information based on a response from the server computer, and to send the monitoring information to the first server computer. The server computer may be configured to receive the notification from the client computer, to determine based on the notification whether monitoring information is to be provided, and if so, send a response comprising a name-value pair based on the received notification to the client computer, and to subsequently receive monitoring information sent by the client computer.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that monitoring information services, which conventionally include a component within the operating system of a client computer, while useful for collecting data associated with applications or APIs executing within the operating system, require continual development to ensure that monitoring information provided by the service is current. Such development may require updates to application code installed within many operating systems, and since operating systems will not, in general, apply new application updates at the same time, monitoring information collected may not always represent the most recently developed set of monitoring information. If a third party, such as a developer of a software application, wishes to analyze monitoring information, being unable to obtain the most recently developed set of monitoring information may be inadequate. Furthermore, where monitoring information is transmitted to a third party for analysis, if client computers provide all monitoring information that could be collected, there may be an unnecessary overhead of computing resources (e.g. CPU, memory, network bandwidth) in cases when only a subset of monitoring information is required for analysis. Additionally, if all client computers transmit monitoring information to a third party to analyze, monitoring information from a particular client might be entirely redundant, depending on the analysis being performed. This introduces a further unnecessary overhead on computing resources.

The inventors have recognized and appreciated that having the ability to sample monitoring information from selected computers, which may be selected based on characteristics of those computers, would reduce such an overhead of computing resources, and would provide for targeted analysis of monitoring information. In addition, the inventors have recognized and appreciated that the ability to sample monitoring information from selected computers may be created to be extensible, such that monitoring information can be sampled in accordance with techniques to be defined in the future with minimal impact to client and server computers.

Figure 1:
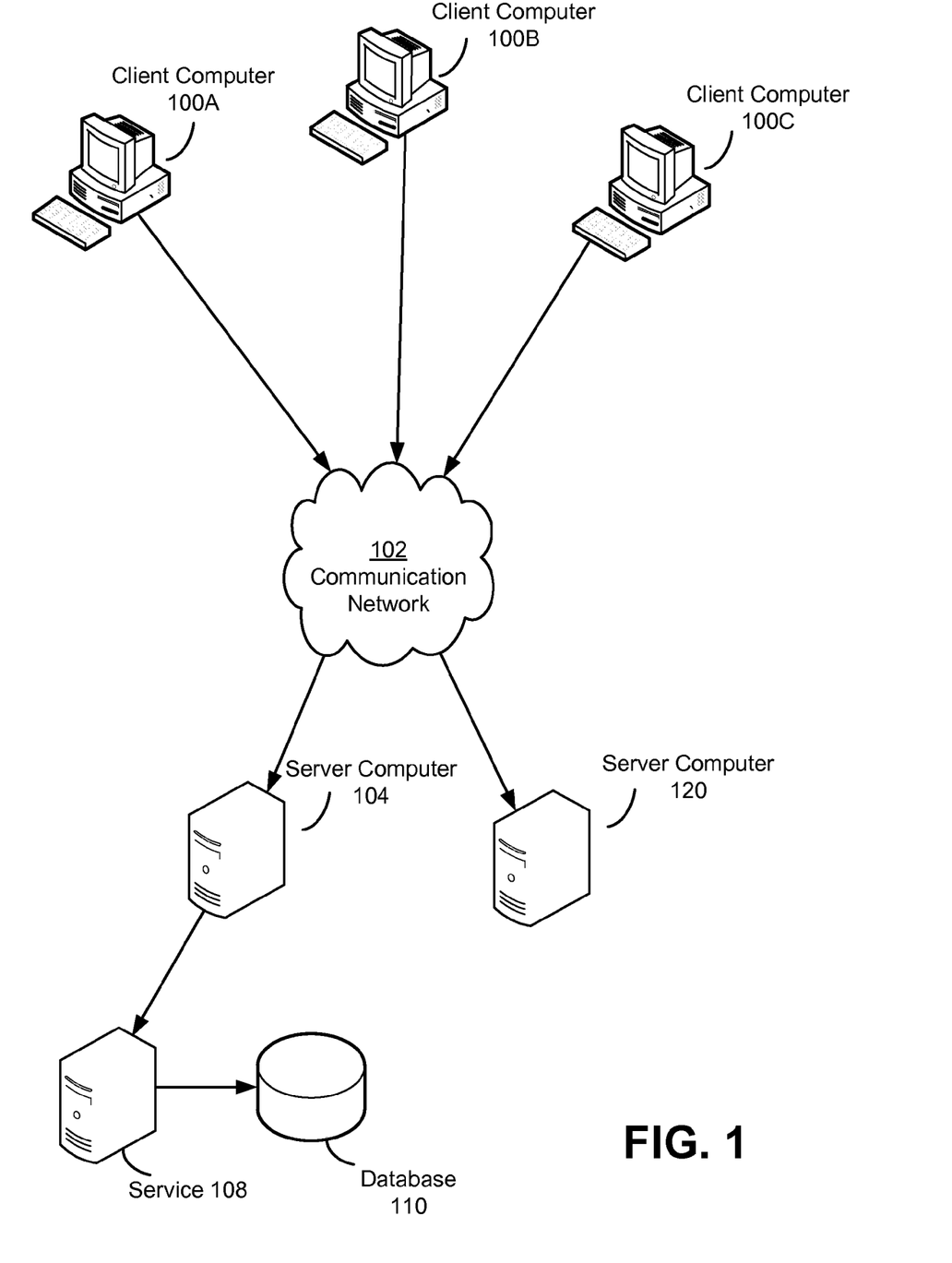
FIG. 1 is a high-level architectural diagram of a server/client computing environment.

FIG. 1 is a high-level architectural diagram of an environment in which the invention may be practiced. The environment of FIG. 1 contains one or more client computers 100A-C configured to communicate with one or more server computers via a communication network 102, where client computers 100A, 100B and 100C are shown for illustrative purposes. Client computers 100A-C may be any suitable computer, such as a laptop computer, a desktop computer or a smart phone. Client computers 100A-C may be loaded with an operating system, which may be any suitable operating system, such as a version of the WINDOWS® operating system provided by Microsoft Corporation.

The client computers 100A-C may execute one or more applications, each of which may be any suitable application capable of executing on the client computer, such as a word processor, a document reader, or a digital music library. The client computers may also operate one or more application programming interfaces (API) to allow software to communicate with each other. The APIs may provide interfaces between, for example, operating system software, applications executing on client computers, applications executing on other client computers or server computers, or software libraries on any client computer or server computer.

In the example of FIG. 1, the client computers 100A-C may be programmed to provide monitoring information to one or more server computers, such as server computer 104, via communication network 102. This information may include, but is not limited to, software version numbers of applications being executed on the client computers, usage statistics for an application, API usage information, and information on errors encountered by an application. The monitoring information may also be a record than an event occurred, or may be state information captured in response to an event. However, the invention is not limited in this regard and monitoring information may comprise any data, commands, or other information relating to monitoring.

In some embodiments, server computer 104 may be programmed to collect certain types of monitoring information, such as the types of monitoring information described above. The server computer may be programmed to request certain types of monitoring information from a client computer, and may provide instructions to a client computer as to what monitoring information it should provide. The server may be programmed in this way without knowing which specific clients may be available to provide monitoring information. Monitoring information may be collected by a server computer using known techniques, for example, by a client computer performing a push to the server computer.

According to some embodiments, a client computer 100A may submit a notification to server computer 104 via the communication network 102. The notification may specify the types of monitoring data that the client is capable of reporting to the server computer. This notification may utilize data formats such as XML, JSON, or YAML, though may utilize any suitable data format. The server may then, via any suitable method, determine which monitoring data to request, if any, and respond to the client computer with an indication of the monitoring data to be provided.

In some aspects, the notification sent by client computer 100A may not directly relate to monitoring information and may instead be a notification to server computer 104 to inquire whether some directive is to be acted upon. The server computer may provide a response containing instructions for the client computer, which the client computer may execute.

A collection policy may be stored on a server computer, or on a device in communication with the server computer, which the server computer may use to determine whether to request monitoring information, and if so, what type(s).

The server computer 104 may be a single server computer or may be a cluster or farm of server computers that can function as a group. Such a configuration may allow a group of computer resources to interface with a client computer via a single logical identity, such as an Internet Protocol (IP) address or a Uniform Resource Locator (URL). Thus, while a client may communicate via the same IP address or URL, communications may be routed to a different physical server computer resource for each connection. However, point-to-point client-server communication may also be utilized.

In some embodiments of a data monitoring system, it may be desirable to configure the server 104 such that a service 108 is provided with a notification from a client computer, which then analyzes the notification and constructs the appropriate response to the client computer. This configuration may be used to limit the logic performed by the front-end server, or may be used so that one or more server computers may act as proxies through which the service may operate, although the use of a service may be configured in this way for any suitable reason. The service 108 may be any set of functionalities that can be reused for different purposes, such as a web service, a WINDOWS® operating system service, or a Unix daemon process.

In some embodiments, the service 108 may communicate with a database 110 that stores logic for the collection of monitoring data. The database may be located on the same server as the service 108, or may be located on a different computer connected to the service via a communication network. The database may be a relational database, such as a Microsoft SQL SERVER® database, or Oracle database, though may be any system in which an organized collection of data is provided. In other embodiments, the service does not make use of a database and instead utilizes logic contained in some other suitable software method.

In some embodiments of a data monitoring service, collection policy updates may be delivered to the service, or to a database in communication with the service, to provide new logic for the collection of monitoring data. For example, if a new application is released into the marketplace it might be desirable to collect monitoring information from any instances of the application that might be executing on client computers. In such a case, some combination of server computer, service and database could be updated such that incoming notifications from such client computers may be newly considered for the providing of monitoring information. Logic updates may be provided by third party vendors in the form of a template such that new monitoring information can be easily collected without direct access to the server computer, service or database from a third party.

The monitoring information may be provided by a client computer to server computer 104, though may instead, in some embodiments, be provided to a second server computer 120. Either approach may be used depending on network infrastructure, how the monitoring information is to be used, or any other suitable factors.

Figure 2:
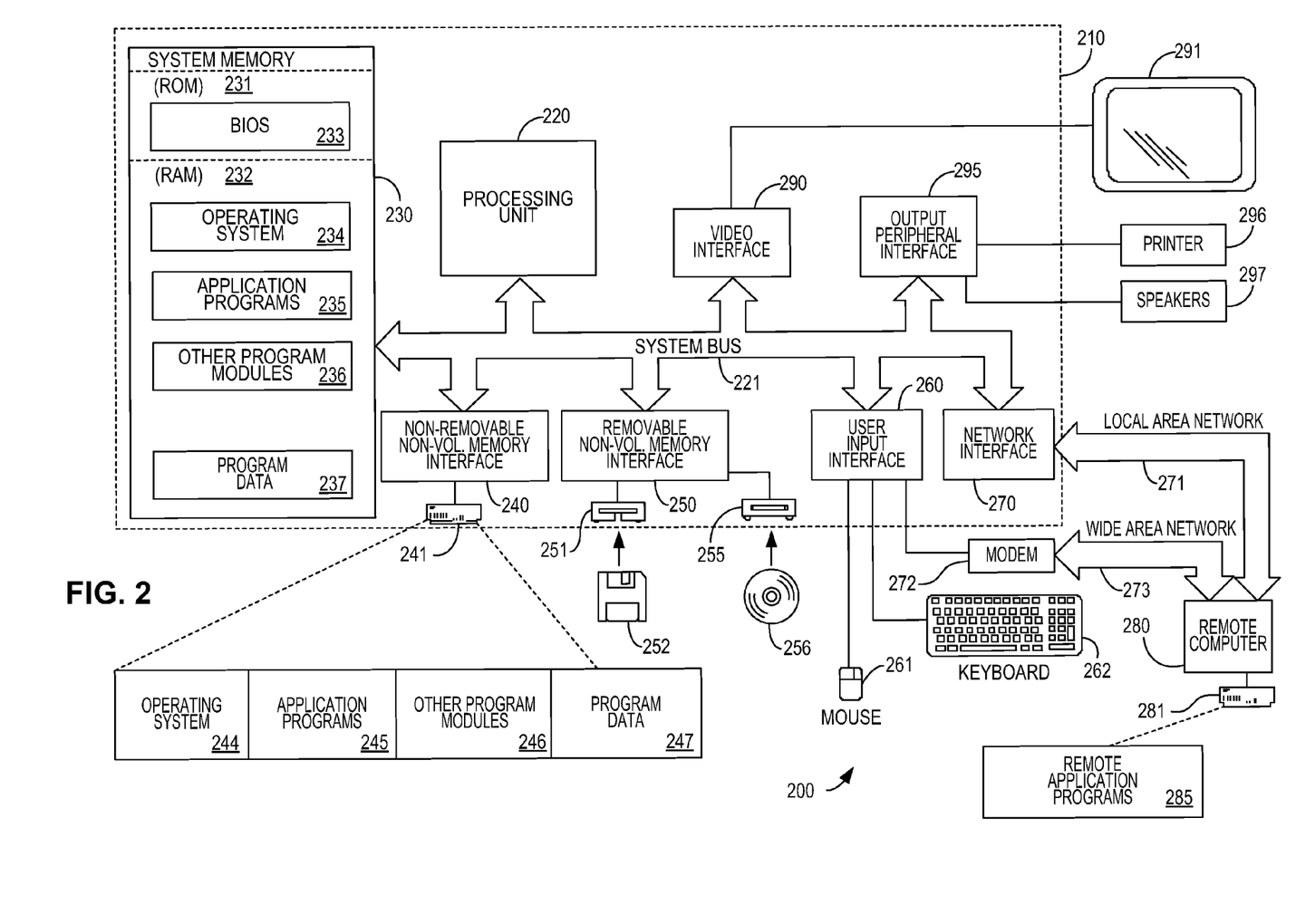
FIG. 2 is an architectural diagram of a general purpose computing device.

FIG. 2 illustrates an example of a suitable computing system environment 200 on which the invention may be implemented, as a server computer, a client computer, or both. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 210. Computer 210 may represent any of client computers 100A-C and server computers 104 and 120 shown in FIG. 1. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. Hard disk drive 241 may store a database, such as database 110, which stores data via program data 237 and/or program data 247. A service, such as service 108, may reside in operating system 244 or operating system 234, and may be configured based on data stored in hard disk drive 241.

A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. Such remote application programs may include a database server, or a service. It will be appreciated that the network connections shown are exemplary and other means of establishing a communications link between the computers may be used.

Figure 3A:
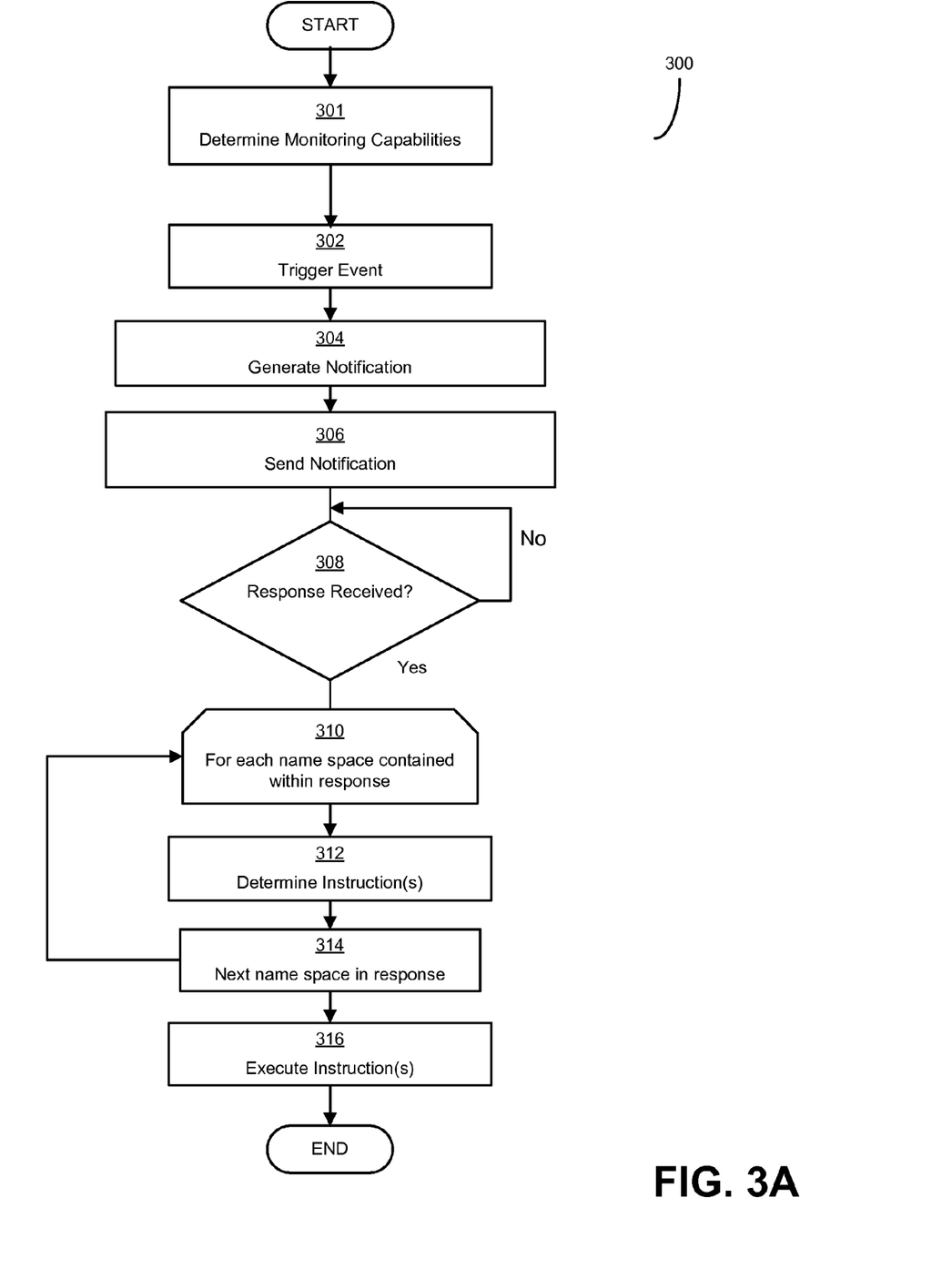
FIG. 3A is a flowchart depicting steps undertaken by a client computer when providing a notification and processing a response from a server computer.
Figure 3B:
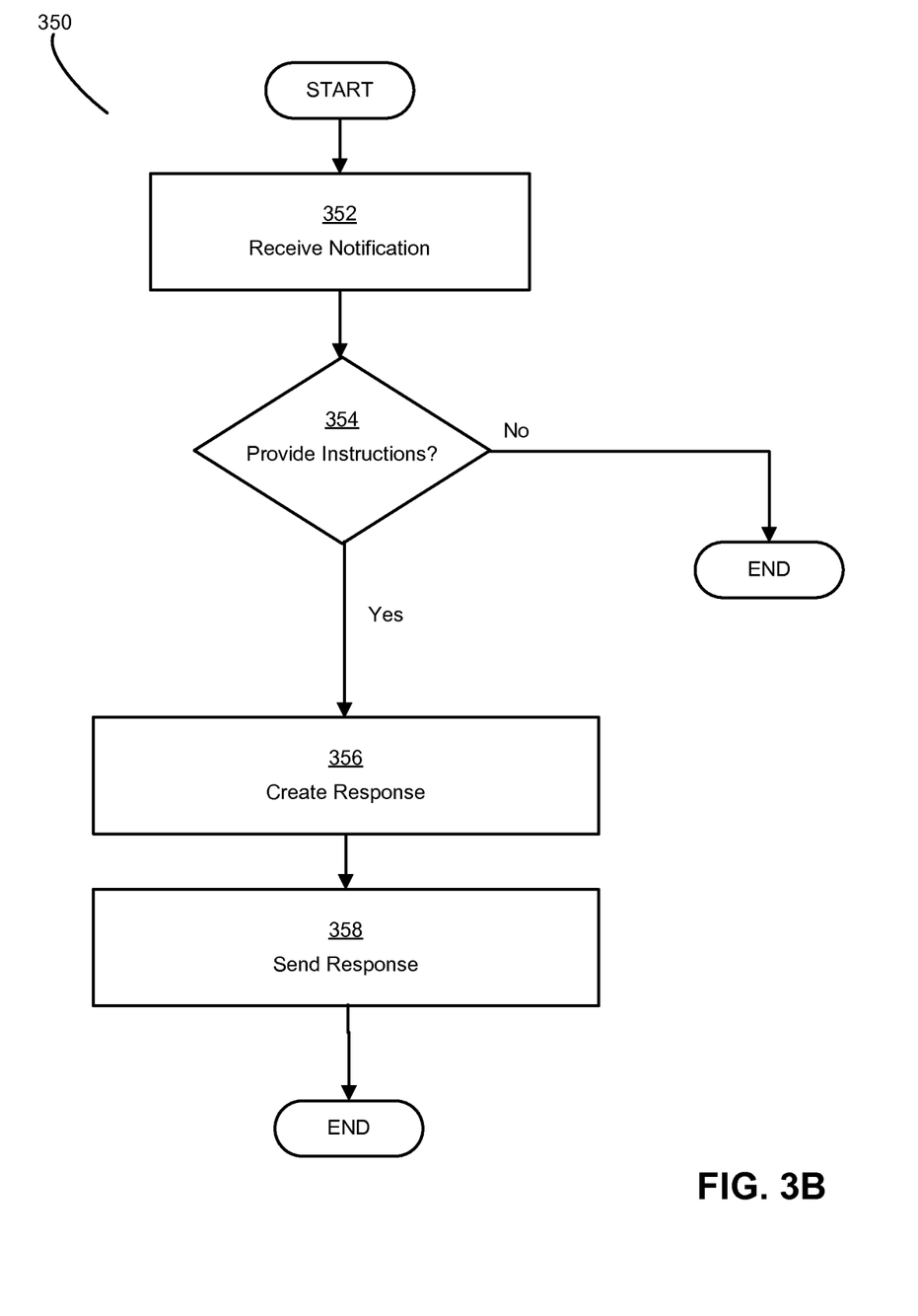
FIG. 3B is a flowchart depicting steps undertaken by a server computer when receiving a notification.

FIGS. 3A-B are flow charts of a method of implementing monitoring data collection according to some embodiments of the invention. FIG. 3A depicts client computer steps, whereas FIG. 3B depicts server computer steps. Specific implementation details of the method illustrated in FIG. 3A-B relate to embodiments of the invention having architectures similar to that illustrated in FIG. 1, as discussed above; however, the method may be applied more generally. In particular, while the method illustrated in FIG. 3A-B describes a response containing data associated with one or more name spaces, the invention may also be applied to other data formats, as the invention is not limited in this regard.

The method 300 shown in FIG. 3A starts with the client computer determining the monitoring capabilities it is able to provide 301. This determination may be based upon a configuration of the client computer. For example, data collection functions may be supplied by software modules that may be loaded on the client computer. The modules may be provided in connection with software applications or hardware components about which monitoring information may be collected. Though, the specific monitoring functions to be performed are not critical to the invention.

The capabilities of the client computer may be determined in any suitable way. In some embodiments, software components used to perform monitoring functions may register when installed. Components may register with a generic monitoring framework within the client computer. Alternatively, installation of a monitoring component may include recording a value in a registry or other database to indicate that a capability is available, and the generic monitoring framework can read that database to determine capabilities. Though, the capabilities may be determined in any other suitable way, including based on previous interactions between the client computer and a server computer, or by data loaded onto the client computer. A client computer may also determine monitoring capabilities using one or more applications executing on the client computer; for example, using a notification monitoring software application installed on a client computer.

Subsequently a trigger event occurs on the client computer at block 302. The trigger event may be a scheduled event prearranged to execute on the client computer, may originate from an application or API being executed on the client computer or elsewhere, or may be due to a user action at a terminal associated with the client computer. In some embodiments the trigger event is an error or failure event occurring on the client computer, such as a crash or application hang. The trigger event may also be any other suitable mechanism for initiating an action.

At block 304, the client computer generates a notification specifying the types of monitoring data that are available to be reported. The notification may utilize data formats such as XML, JSON, or YAML, though may utilize any suitable data format. In some embodiments of the invention, the notification may not directly relate to monitoring information and may instead be a generic notification to a server computer to inquire whether some directive is to be acted upon. As the logic for handling notifications exists on the server computer, or, in some embodiments on a service in communication with the server computer, the invention is not limited as to the range of possible data formats that can be applied to the notification.

In some embodiments, the notification may contain a unique identifier representing the client computer. This identifier may be obtained in any suitable way, including by the operating system software generating and storing a unique identifier upon installation. The unique identifier may be included in the notification with one or more location identifiers, such as by placing the unique identifier inside a specific XML tag, or in a predetermined location in the notification, such as within the first 64-bytes. However, any suitable method of identifying the unique identifier in the notification may be used.

The notification generated in 304 may also contain one or more identifiers to be used to identify a type of monitoring information that a client computer is configured to be able to provide. The identifiers may be in the form of name-value pairs, or may be included in a predetermined location in the notification, for example in a file header. The identifiers may also comprise a sequence of bytes or characters understood by a server computer, or a service with which the server computer communicates, such that the types of monitoring information available may be identified by searching a notification for a particular sequence of bytes or characters.

In some embodiments, the notification may take the form of XML data and the types of monitoring information available may be represented by values in one or more name spaces. An XML data file may also represent the types of monitoring information available via a suitable combination of markup and content. The types of monitoring information may also be denoted via data formats which uses name/value pairs, such as JSON. However, any suitable data format may be used to identify the one or more types of monitoring information that may be obtained.

In embodiments of the invention in which the notification generated in 304 contains identifiers used to identify one or more types of monitoring information that may be obtained by the server, the types of monitoring information identified may include: software version numbers of applications being executed on a client computer, usage statistics for an application, API usage information, and information on errors encountered by an application. Though, any suitable monitoring information may be identified by identifiers in the notification.

The notification generated in 304 may be provided in a format defined by the generic framework, but may contain information in accordance with an interface contract between the client computer and the server computer. The contract may be identified by a "name space." If a client and a server both recognize the name space, both can use commands and/or supply data elements as defined in that name space to communicate notifications. Any suitable mechanism may be used to configure both the client and server to recognize a common name space. For example, software updates may be applied to the client computer and server computer such that the client computer is able to supply notifications that the server computer can understand. A name space, for example, may be associated with a specific software or hardware component for which monitoring information is to be collected. Conversely, by identifying a name space, if the server either does not recognize the name space, or does not require monitoring information associated with that name space, the server may ignore any part of the notification associated with that name space.

In some embodiments of the invention, a policy may be associated with a name space and stored on the client computer as a way to control when notifications are provided. Though, any policy, whether or not associated with a name space, may control whether the client computer sends a notification and under what circumstances. The circumstances may be based on the date or time, the API versions installed, whether a particular application is executing on the client computer, or any other suitable criteria. In some embodiments, the client may send notifications without any prior interaction or commands from the server. Though, it should be appreciated that the generic framework may support commands issued by a server that control when or under what circumstances a client subsequently issues a notification.

In some embodiments of the invention, only notifications with contents dictated by particular name spaces for which the server computer is configured to collect monitoring information will result in the server computer requesting monitoring information. This may mean that some notifications from client computers will not generate a response to the client computer, or may instead generate a response indicating that the client computer should not perform monitoring according to its capabilities.

Once the notification has been generated, it is sent to the server computer in block 306. The sending of such a notification may be performed in the same manner as a conventional error reporting system. The network location of the server computer that is to receive the notification may be identified in any suitable way, including by the hardware and/or software which generated the notification, or by a fixed IP address or URL.

Regardless of how the notification is sent to the server via the communication network, in block 308 the client computer may establish monitoring based on whether it receives, and consents to, a response. Once the response is received by the client computer, the client computer may perform validation steps on the response data. This may include validation of the format of the data. For example, if the response data is XML data, a client computer may ensure that the response is a valid XML document. The client computer may also validate the content of the response data, which may include a determination of whether the content meets certain predetermined criteria. A client computer may also validate that the name space(s) present in the response are recognized by the client computer. Validation may also be based on other criteria, such as business requirements, that determine whether monitoring as requested is in compliance with a monitoring policy on the client computer. A monitoring policy, for example, may limit the total amount of time spent monitoring or otherwise indicate when and to what extent the client computer will participate in monitoring. Alternatively or additionally, a monitoring policy may be based on a degree or consent provided by a user of the client computer. If validation is performed and the response data fails validation, the client computer may send a message back to the server computer as a notification that the received response failed validation. Though, in some embodiments, the client computer may simply not respond to a response that fails validation.

In the example of FIG. 3A, blocks 310-314 loop over a set of name spaces or contexts represented in the response. Such name spaces may be associated with, or may contain, one or more commands in a response. The name spaces may provide a way to make the response extensible, such that a name space recognized by both a client computer and a server computer can result in actions being performed via commands contained in the name space. For example, a name space may contain commands associated with an API, and a client computer may consequently identify the name space used in a response from a server computer and take necessary action relating to the API based on that identification. Any number of name spaces may be used in a single response.

Regardless of the exact form the name spaces take, in the example of FIG. 3A at block 312 the client computer determines instructions from the response. The instructions may be any directive to be followed by a client computer, and may be interpreted by the client computer to determine the exact course of action to take. The instructions may be commands that are executed directly by a client computer, or may be directives that are interpreted by a client computer to determine what actions, if any, it is to take. For example, an instruction in a response may be a value contained within a name space that is understood by a client computer. The client computer, having been configured to recognize the name space, may execute steps based on identification of the name space and the value. In some embodiments, the response may cause a client computer to collect monitoring information by executing one or more instructions contained within the response. The client computer may also perform an analysis based on the response data, and take actions to collect monitoring information based on the response data and the analysis. However, any approach in which the collection of monitoring information is based on the response data may be used.

In block 314, the client computer evaluates whether it has examined response data associated with all of the name spaces contained within the response, and if so, proceeds to block 316. If the response contains data associated with name spaces that have not yet been examined, the client computer returns to block 310.

Once the client computer reaches block 316, it executes the instructions determined in block 312. This may result in, for example, the collection of monitoring information and sending the monitoring information to a server. The instructions may also result in the configuring of one or more monitoring components to collect information. Any server may be the recipient of monitoring information, including the server to which the notification was sent in block 306. The server which receives the monitoring information may depend on business needs, an established contract between a client computer and a server computer, network infrastructure, or any other scenario. In some embodiments of the invention, the response received in 308 informs the client computer where the monitoring information is to be sent, either by supplying a network location such as an IP address or URL, or by providing data which the client computer can interpret to determine the location. Such interpretation may be informed by an established contract.

In some embodiments of the invention, the response contains an instruction relating to a throttle directive. Such an instruction may be provided to a client computer inside a response from a server computer responding to a notification from the client computer, and may result in actions by the client computer that reduce the frequency of monitoring data reporting and/or notifications the client computer provides. For example, the response may comprise an instruction which causes the client computer to subsequently provide a notification to a server computer every n days, where n is a number. The throttle directive may have a preset expiry date and time, may decay such that the frequency gradually returns to its previous value over time, or may last until an instruction from the server computer overrides the throttle directive.

FIG. 3B is a flow chart of a method of implementing monitoring data collection on a server computer according to some embodiments of the invention. The method 350 shown in FIG. 3B starts at block 352 when a notification is received from a client computer. This may, for example, be a notification sent at block 306 in FIG. 3A.

At block 354, the notification received at 352 is evaluated to determine whether to provide instructions to the client computer. The server computer may make this decision by examining the notification in addition to an established collection policy, or may communicate with a service, such as service 108 shown in FIG. 1, to determine whether to respond to the client computer. A collection policy established on a server computer or service, may be associated with a particular name space in notifications, or in responses to notifications. Each name space may be associated with a collection policy, such that a collection policy may be applied as a result of identifying a name space present in a notification.

In embodiments of the invention in which the notification contains a unique identifier representing the client computer that sent the notification, the decision of whether monitoring information is to be provided may depend upon the unique identifier. This approach may be followed, for example, to allow the targeting of specific client computers. In lieu of the above examples, any suitable method to determine, based on the notification, whether monitoring information is to be provided to the server may be used.

In other embodiments, the instructions provided at block 354 may instruct a client computer to provide other targeted information. The targeted information may relate to performance metrics, but may also include any other monitoring information that may be provided by a client computer. Examples of such information include: information on applications installed on a client computer, error logs or hard disk drive usage statistics.

For example, a notification may contain information about application X. The server computer receiving the notification may have a collection policy to gather information on client computers that execute both application X and application Y. The instructions provided by the server computer to the client computer may therefore instruct the client computer to provide a subsequent notification containing information on application Y in addition to application X, or, in the event that application Y is not being executed by the client computer, containing information indicating that application Y is not being executed by the client computer.

In one embodiment, a set of collection policies may be loaded onto a server computer, or on a service in communication with a server computer, with the aim of evaluating the impact a change to an API might have on a group of client computers. The collection policies may target particular applications, or particular versions of applications, for example, executing on the client computers.

Initial notifications sent by a client computer may result in the establishment of a contract between each client computer and the server computer, which may result in targeted client computers providing information in subsequent notifications that relates to the change to the API being investigated. For example, a notification may provide the version number of a particular application executing on the client computer.

A server computer, informed by a collection policy, may send a response to a client computer requesting additional information regarding an application. Subsequent notifications from the client computer may contain specific targeted information relating to the application that can be used by the server computer in determining the impact a change to an API might have. The targeted information may, for example, relate to an application rarely used by client computers, in which case information on the application can be obtained in a highly efficient manner with no impact to client computers not using the application. The targeted information may also be a unique identifier representing a specific client computer, in embodiments in which a collection policy aims to target specific client computers.

If, at block 354, the server computer determines that instructions are not to be provided, the process may end, as in the example of FIG. 3B. However, in other embodiments, the server computer may send a response to the client computer as a notification that no instructions are to be provided.

If the server computer determines that instructions are to be provided, at block 356 a response to the client computer is created. Any suitable configuration of response data may be used that allow the client computer to perform actions based on the response, such as to collect monitoring information; the invention is not limited in this regard. The instructions may also instruct a client computer to provide additional information in another notification in order to determine whether monitoring information may subsequently be requested, and if so, what the monitoring information should be.

In some embodiments, a response in 356 is generated using a name space associated with the collection policy used to generate the response. Such a collection policy may have been used in response to a name space contained in a notification received by a server computer. The response sent to the client computer will therefore be generated using the name space, and will be supported by the client computer.

In some embodiments, a collection policy used to generate a response in block 356 may be supplied by a software developer or third party. Such a collection policy may be supplied, for example, to target specific information of interest to the software developer or third party.

The response in 356 may be generated, for example, by a server computer or by a service, such as service 108 in FIG. 1. In some embodiments of the invention, the response data contains a set of instructions intended to be interpreted and executed by the client computer. Such instructions may be provided to the server computer by a service 108 such that the server computer plays no part in either analysis of an incoming notification nor creation of an outgoing response. In other embodiments of the invention, however, the server computer may perform all these tasks.

In embodiments of the invention in which the notification contains a unique identifier representing the client computer that sent the notification, the content of the response may depend upon the unique identifier value. This approach may be followed to target specific client computers for specific monitoring information. Targeting specific client computers may be performed, for example, in order to target client computers known to have previously reported problems or errors to the server computer, or to target client computers known to be running particular combinations or applications or API versions.

A unique identifier representing a client computer contained in a notification may be used as a 'search key', which is a unique value used to perform a lookup operation as part of a determination of the monitoring information to be provided. Such a lookup may be performed, for example, by accessing a database or service in communication with the server computer that examines stored data to determine whether the search key finds a match in the stored data. If so, the stored data may dictate the appropriate action to be taken by the server computer. For example, a name space provided in the notification may be used to generate a hash value (such as an MD5 hash), and may be combined with other values passed from the client computer in the notification, the combination of which may be used to generate a further hash value which is then used as a search key. Any suitable approach that utilizes data in the notification to generate a search key may be used.

In the example of FIG. 3B, the criteria that determine the response created for a given notification may change over time. For example, changing business requirements may result in reprogramming the logic employed by a server computer or service in creating the response. The criteria evaluated by the server computer or service may also include the date and/or time of day. This would, for example, allow the targeting of specific monitoring information at weekends or at a specific time of the year.

In some embodiments, the response sent at 356 contains an instruction that causes a client computer to provide error data. For example, an instruction may result in a client computer providing monitoring information containing data on an error in a particular application, or may cause a client computer to send a notification containing error information when a subsequent error occurs.

In some embodiments, the response sent at 356 contains an instruction that causes a client computer to provide version information on an application or API that it is executing, or that it has installed. For example, an instruction may result in a client computer providing monitoring information containing the version numbers of installed libraries (e.g. a dynamic link library), the version of a particular application being executed on the client computer, or data on the components of the client computer operating system.

At block 358, the response is sent to the originator of the notification received at block 352. The response may, or may not, be validated at any step of the process. In some embodiments of the invention neither the server computer, service nor database attempt to interpret or validate the generated response. In the example of FIG. 3B, the monitoring information is received at block 360, after the response was sent in block 358.

Figure 4:
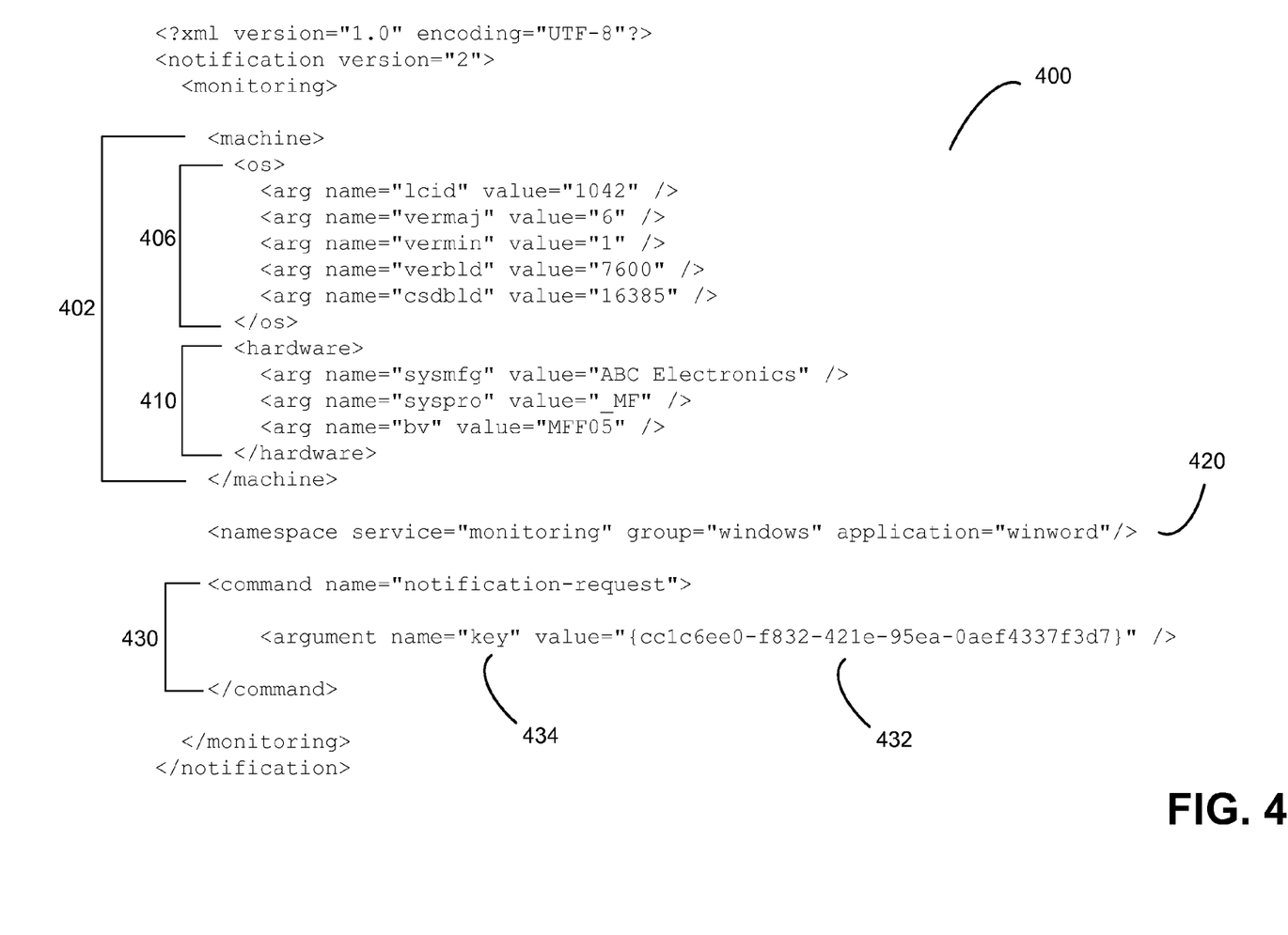
FIG. 4 shows an XML embodiment of a notification sent by a client computer.

FIG. 4 shows a notification 400 that might be sent from a client computer to a server computer in step 306. In the example of FIG. 4 the data format is XML, though as described above the invention is not limited in this regard.

In some embodiments of the invention, the notification may contain data sampled from the client computer, as shown by element 402 in FIG. 4. This data may, or may not, be used in creating a response by the server computer, and may contain information, for example, on the client computer operating system (such as shown in element 406), client computer hardware (such as element 410), or applications installed on the client computer. This sampled data may be provided as name value pairs, as in FIG. 4, or may be provided in any other suitable way, and in any suitable data format.

The notification in FIG. 4 contains a name and value 420, expressed hierarchically. In the example of FIG. 4, the name-value pair 420 provides a name, which may be interpreted as a name space, of "service.group.application" with a value of "monitoring.windows.winword". In addition, a single argument 430 is provided specifying a value 432 for an argument named 'key' 434. In this example, the notification contains a search key provided by the client computer to be used by the server computer in determining whether monitoring information is to be provided, and if so, what that monitoring information should be. Value 432 is depicted in FIG. 4 as a 36-byte value, though any suitable value may be used as a search key. The search key, as discussed above, may be a unique identifier which represents the client computer.

Figure 5:
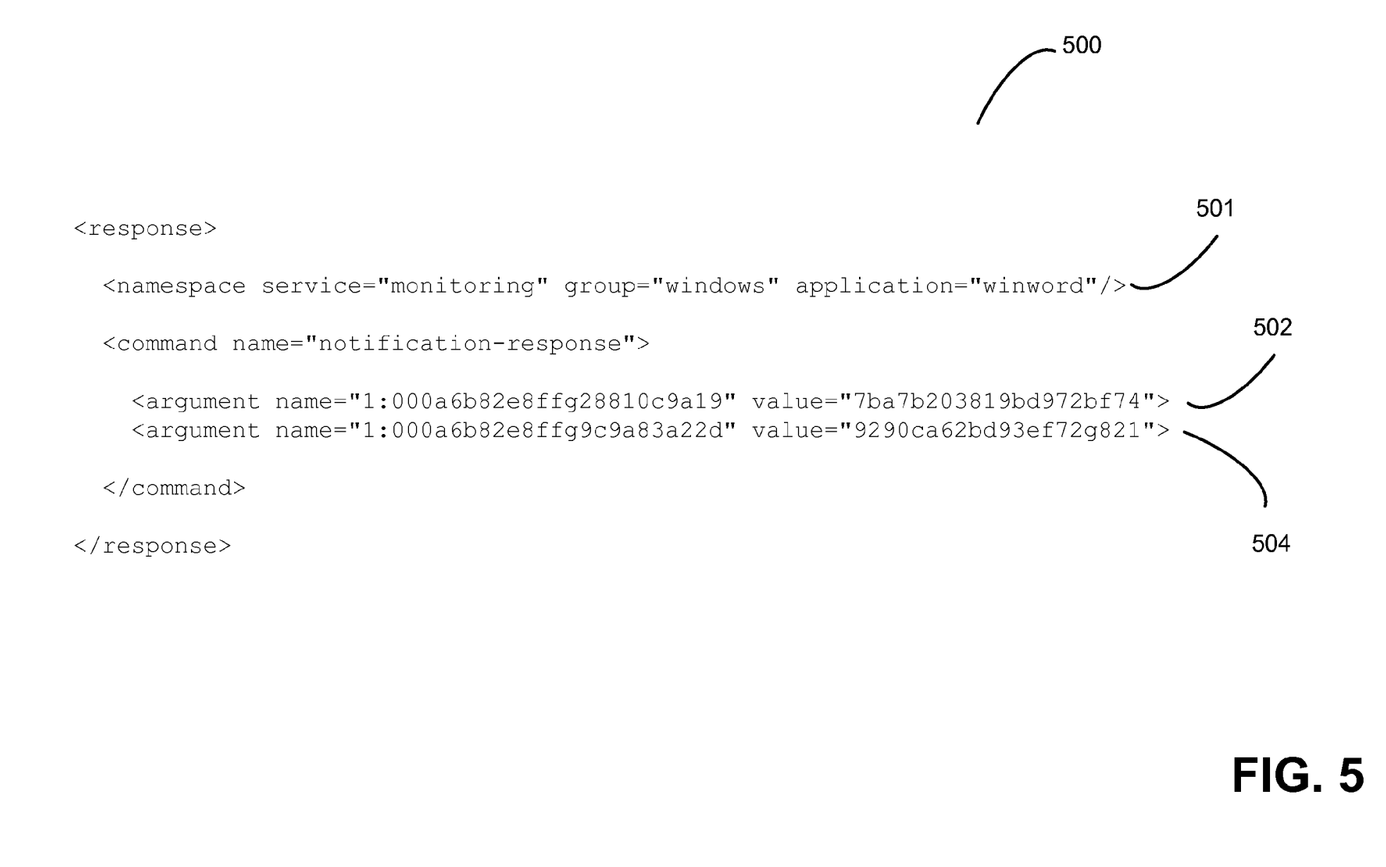
FIG. 5 shows an XML embodiment of a response sent by a server computer.

FIG. 5 shows a response 500 that might be sent from a server computer to a client computer in step 358. As in FIG. 4, the data format is XML, though as described above the invention is not limited in this regard. This response may be sent by a server after receiving the notification of FIG. 4 and making a decision that instructions are to be provided based on the notification.

In the example of FIG. 5, two instructions 502 and 504 are contained within the response data, in addition to a name-value pair 501. The instructions may be determined by a server computer, or by a service in communication with the server computer, as described above. The instructions may result in a client computer providing particular monitoring information to a server computer. The arguments shown in FIG. 4 are provided as an example, and the form of the response data is not limited to the form shown in the figure.

In some embodiments, the response 500 contains an instruction in a name space supported by a client computer. The client computer may execute the instruction or may perform actions based upon the instruction. In some embodiments, actions performed by a client computer based on an instruction in response 500 may depend on software being executed on the client computer. Two client computers receiving the same response but having some difference in their software being executed may initiate the same action, or may initiate different actions.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method of receiving monitoring information, the method comprising:
    at a server computer, receiving a notification from a client, the notification including identification comprising a unique identifier associated with the client and types of monitoring information associated with the unique identifier;
    determining, based on the received notification and a collection policy, whether monitoring information is to be provided by the client and determining specific monitoring information to request based on the identification of the types of monitoring information provided in the notification from the client, wherein the collection policy is associated with a name space and the determining includes applying the collection policy based on identifying the name space in the notification; and
    when it is determined that monitoring information is to be provided by the client:
        sending a response to the notification received from the client, wherein the response includes a request for the specific monitoring information and a determination of a frequency of notifications to be received at the server computer based on the collection policy; and
        receiving the specific monitoring information from the client.

2. The method as recited in claim 1, wherein:
    the unique identifier provided by the client is an identifier corresponding with one or more name spaces associated with the client.

3. The method as recited in claim 1, wherein the identification identifies data relating to one of an application and an application programming interface (API).

4. The method as recited in claim 1, wherein:
    the notification is sent by a client computer; and
    the unique identifier representing one or more software or hardware components of the client computer.

5. The method as recited in claim 1, wherein the specific monitoring information is sent to a second server computer.

6. A computer storage device having computer-executable instructions for performing, in a client/server computing environment, a method for reporting information to a server computer, the method comprising:
    sending, by a client computer, a notification to a server computer, the notification including an identifier of a name space associated with a collection policy and identification of types of monitoring information associated with the name space;
    receiving, at the client computer, a response to the notification, wherein the response includes a request for specific monitoring information based on the identification of the types of monitoring information in the notification and a determination of a frequency of notifications to be sent to the server computer based on the collection policy;
    collecting the specific monitoring information based on the response; and
    sending the specific monitoring information to the server computer.

7. The computer storage device of claim 6, wherein the identifier identifies data relating to an application associated with the name space.

8. The computer storage device of claim 7, wherein the identifier identifies data relating to one of an application and an application programming interface (API) associated with the name space.

9. The computer storage device of claim 6, wherein the specific monitoring information is collected by executing commands provided by the response from the server computer.

10. The computer storage device of claim 6, wherein the notification sent by the client computer comprises a unique identifier representing a hardware or software component associated with the name space of the client computer.

11. The computer storage device of claim 6, wherein the notification sent by the client computer is determined, at least in part, based on a name-value pair associated with the name space.

12. The computer storage device of claim 6, wherein the specific monitoring information is sent to a second server computer.

13. A system comprising:
    a client computer configured to send, to a server computer, a notification comprising a unique identifier associated with the client computer and identification of types of monitoring information associated with the unique identifier of the client computer, to collect monitoring information based on a response from the server computer, and to send the collected monitoring information to the server computer; and
    the server computer configured to receive the notification from the client computer, to determine, based on the notification and a collection policy, whether monitoring information is to be provided by the client computer and determine specific monitoring information to request based on the identification of the types of monitoring information provided in the notification by the client computer, wherein the collection policy is associated with a name space and the determination includes applying the collection policy based on identifying the name space in the notification, and wherein when it is determined that monitoring information is to be provided, a response to the notification to the client computer, comprises an identifier corresponding with the unique identifier provided by the client computer in the notification, a request for the specific monitoring information associated with the unique identifier, and a determination of a frequency of notifications to be received at the server computer based on the collection policy, and wherein the specific monitoring information is sent by the client computer based on the response from the server computer.

14. The system of claim 13, wherein the unique identifier including a name-value pair associated with one or more name spaces of the client computer.

15. The system of claim 14, wherein the identifier identifies data relating to one of an application and application programming interface (API) on the client computer.

16. The system of claim 13, wherein the specific monitoring information is collected by the client computer executing commands provided by the response from the server computer.

17. The system of claim 13, wherein the notification sent by the client computer comprises a unique identifier representing a hardware or software component associated with one or more name spaces of the client computer.

18. The system of claim 13, wherein a second server computer is configured to receive the specific monitoring information sent by the client computer.

19. The method of claim 1, wherein the response includes a throttle directive providing an instruction to reduce the frequency of monitoring data reporting the client computer provides.

20. The system of claim 13, wherein the response includes a throttle directive providing an instruction to reduce the frequency of monitoring data reporting the client computer provides.

* * * * *